US007835935B2

(12) United States Patent
Danninger

(10) Patent No.: US 7,835,935 B2
(45) Date of Patent: Nov. 16, 2010

(54) USABILITY AND FUNCTIONALITY OF MANAGER SELF-SERVICE REMINDER OF DATES IVIEW

(75) Inventor: Michael Danninger, Landau (DE)

(73) Assignee: SAP AG, Walldorf (DE)

( * ) Notice: Subject to any disclaimer, the term of this patent is extended or adjusted under 35 U.S.C. 154(b) by 1239 days.

(21) Appl. No.: 11/412,316

(22) Filed: Apr. 26, 2006

(65) Prior Publication Data
US 2007/0255609 A1 Nov. 1, 2007

(51) Int. Cl.
G06F 9/46 (2006.01)
(52) U.S. Cl. .......................................... 705/8
(58) Field of Classification Search ............... 705/8, 705/9
See application file for complete search history.

(56) References Cited
U.S. PATENT DOCUMENTS 6,369,840 B1 * 4/2002 Barnett et al. ............... 715/853
2004/0109025 A1 * 6/2004 Hullot et al. ................ 345/764
2007/0016646 A1 * 1/2007 Tendjoukian et al. ....... 709/206

OTHER PUBLICATIONS

Chernoff, Neil. "New Software Out for Complex Scheduling Tasks." Telecommuting Review: the Gordon Report, vol. 6, No. 4, p. 10(1), Apr. 1, 1989.*
Templin, Ben. "With OnTime for Windows, You'll Never Be Late." Computer Shopper, vol. 12, No. 12, p. 542(2), Dec. 1992.*

* cited by examiner

Primary Examiner—Susanna M Diaz
(74) Attorney, Agent, or Firm—Kenyon & Kenyon LLP

(57) ABSTRACT

A software tool allows a manager to integrate the dates displayed in the Reminder of Dates iView with his personal calendar. A manager may also make modify those dates automatically entered into his personal calendar, and these changes with also modify the information maintained in the backend system.

21 Claims, 6 Drawing Sheets

USABILITY AND FUNCTIONALITY OF MANAGER SELF-SERVICE REMINDER OF DATES IVIEW

BACKGROUND

The present invention is a tool for allowing a manager to integrate the Reminder of Dates iView with his own personal calendar. Specifically, certain types of dates displayed in the "Reminder of Dates" iView may be automatically entered into the manager's calendar.

Currently, a manager's reminder dates, specific to his employees, are automatically displayed in the "Reminder of Dates" Manager Self-Service portal. These dates are generated by the backend system which maintains all human resource data. A manager may wish to view certain dates pertaining to his employees in his own personal calendar in order to have all his important information in a single calendar and to better keep apprised of upcoming events. If a manager wishes to enter these reminder dates in his personal calendar, he must do so manually. It would be useful if some or all of these dates could be automatically transported to the manager's personal calendar.

DETAILED DESCRIPTION

Embodiments of the present invention work integrate existing Reminder of Dates iView with a manager's personal calendar, such as Microsoft Outlook, for example. A backend system, such as an R3 database, maintains the human resource data relating to each employee. For example, the data maintained in the backend system may include employee birthdays, employee start dates and contract terms, and employee leave such as maternity or disability leave. The backend system also maintains a correlation between a manager and his employees. The dates which relate to the manager's employees are automatically displayed in the Reminder of Dates iView in the manager's computer system. There is a personalization dialogue whereby the manager may select which types of dates he wishes to have displayed in the Reminder of Dates iView. For example, the manager may wish to display employees' anniversaries and employees' birthdays. In an embodiment of the present invention, the personalization dialogue contains an additional feature which allows the manager to indicate whether he would also like his selected dates to be displayed in his personal calendar. A manager may select certain types of dates to be displayed in this Reminder of Dates iView, but may choose only a subset of those dates to be displayed in his personal calendar. For example, a manager may select employees' birthdays and anniversaries to be displayed in his Reminder of Dates iView, but may select only employees' anniversaries to be displayed in his personal calendar. In an embodiment of the present invention, a manager may change a date that has been automatically inserted into his personal calendar, and this may also change the date in the Reminder of Dates iView and in the backend system. For example, a manager may have selected that all employee birthdays be displayed in the Reminder of Dates iView and in his personal calendar. The manager may notice an error in an employee birthday in his personal calendar. If the manager changes the employee birthday in his personal calendar, the date may also be changed in the Reminder of Dates iView and in the backend system.

Figure 1:
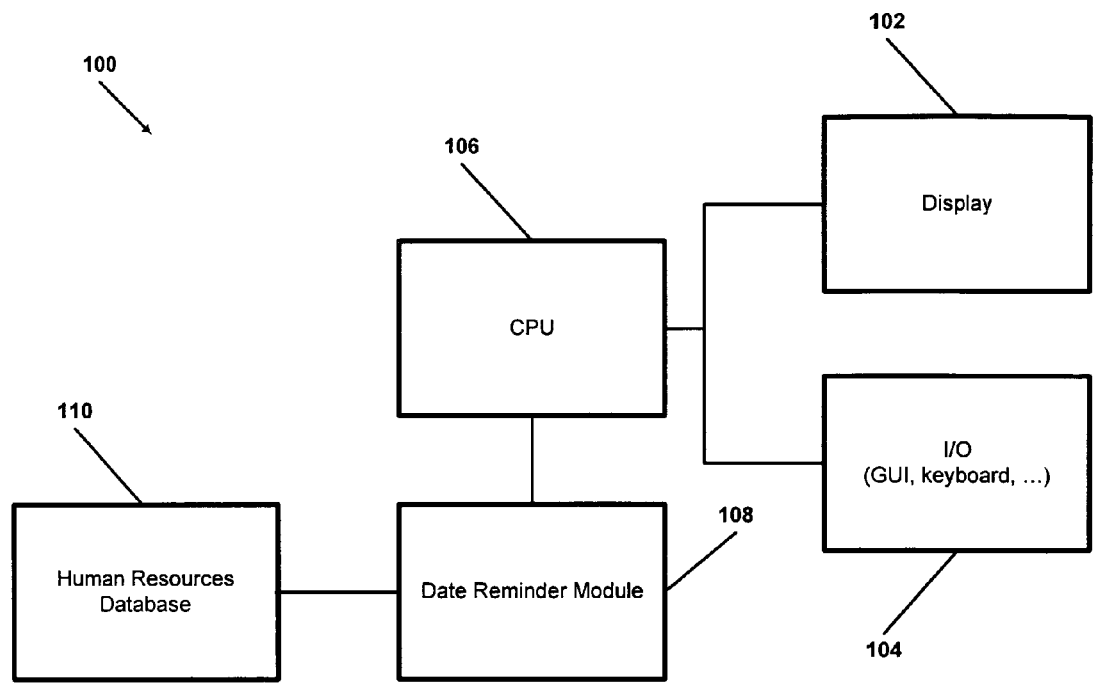
FIG. 1 is a simplified block diagram of a computer system according to an embodiment of the present invention.

FIG. 1 is a simplified block diagram of an exemplary computer system 100 suitable for use with the present invention. A manager may view the Reminder of Dates iView via the display 102. The manager may access a personalization dialogue and select by way of an input/output (I/O) device 104 certain categories of dates to be displayed in the Reminder of Dates iView. The manager may also be able to select a subset of those dates that are displayed in the Reminder of Dates iView to also be displayed in his personal calendar. For example, the manager may wish that all dates indicating when employees' contracts end and all dates relating to extensive leave by employees, such as disability leave or maternity leave, be displayed in his Reminder of Dates iView. However, the manager may wish for only the dates indicating when his employees' contracts end to be displayed in his personal calendar. The manager may select only the dates relating to the end of his employees' contracts to be displayed in his personal calendar. Once the manager has selected, via the I/O device 104, the types of dates that he wishes to be displayed in the Reminder of Dates iView and in his own personal calendar, respectively, the CPU 106 may pass this request onto the date reminder module 108. The date reminder module 108 may access the human resources database 110 to retrieve the types of dates selected by the manager. Because the identity of the manager is associated with his employees, the date reminded module 108 will access only those dates associated with the manager's employees. The date reminder module 108 may return the selected dates to the CPU 106 which will display it in the Reminder of Dates iView and the manager's personal calendar, respectively.

The manager may also change dates that have been entered into his personal calendar by an embodiment of the present invention. If the manager changes a date that has been automatically entered into his personal calendar by an embodiment of the present invention, this change may also affect the date recorded in the Reminder of Dates iView as well as the date maintained in the human resources database 110 located in the backend. For example, the manager may request that all dates corresponding to employee leave be displayed in his calendar. There may be an entry in his calendar and in his Reminder of Dates iView that employee A will be on maternity leave until date X. The manager may have been informed that A will return to work on date Y. If the manager changes the date in his calendar from X to Y, this change may also be reflected in the Reminder of Dates iView and in the human resources database 110 located in the backend system.

The dates automatically inserted into a manager's personal calendar may contain an identifying tag so that the CPU 106 may later differentiate between the dates that were manually entered into the manager's calendar and the dates that were automatically entered into the manager's calendar by an embodiment of the present invention.

Figure 2:
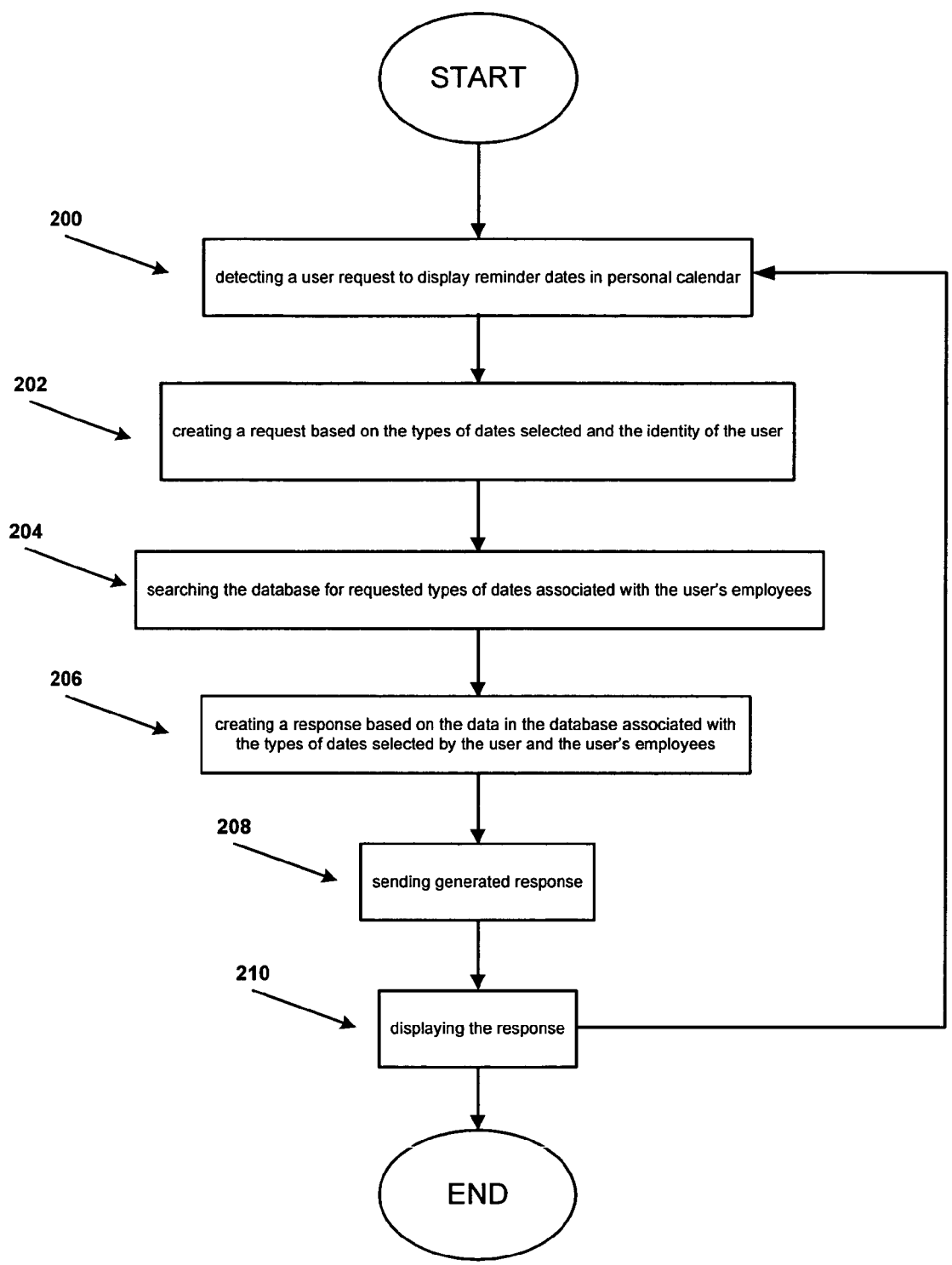
FIG. 2 is a dataflow diagram illustrating the operation of one embodiment of the present invention.

FIG. 2 is a dataflow diagram of one embodiment of the present invention. The method begins when the CPU 106 detects a user request to display certain types of reminder dates in his personal calendar, step 200. The CPU 106 creates a request based on the types of dates selected and the identity of the user, step 202. The CPU 106 passes the request onto the date reminder module 108, which searches the human resources database 110 for the requested dates, step 204. The date reminder module 108 creates a response consisting of the types of dates selected by the user which are associated with the user's employees, step 206. The date reminder module 108 sends the response to the CPU 106, step 208. The CPU 106 then displays the retrieved dates in the user's personal calendar on the display 102, step 210.

Figure 3:
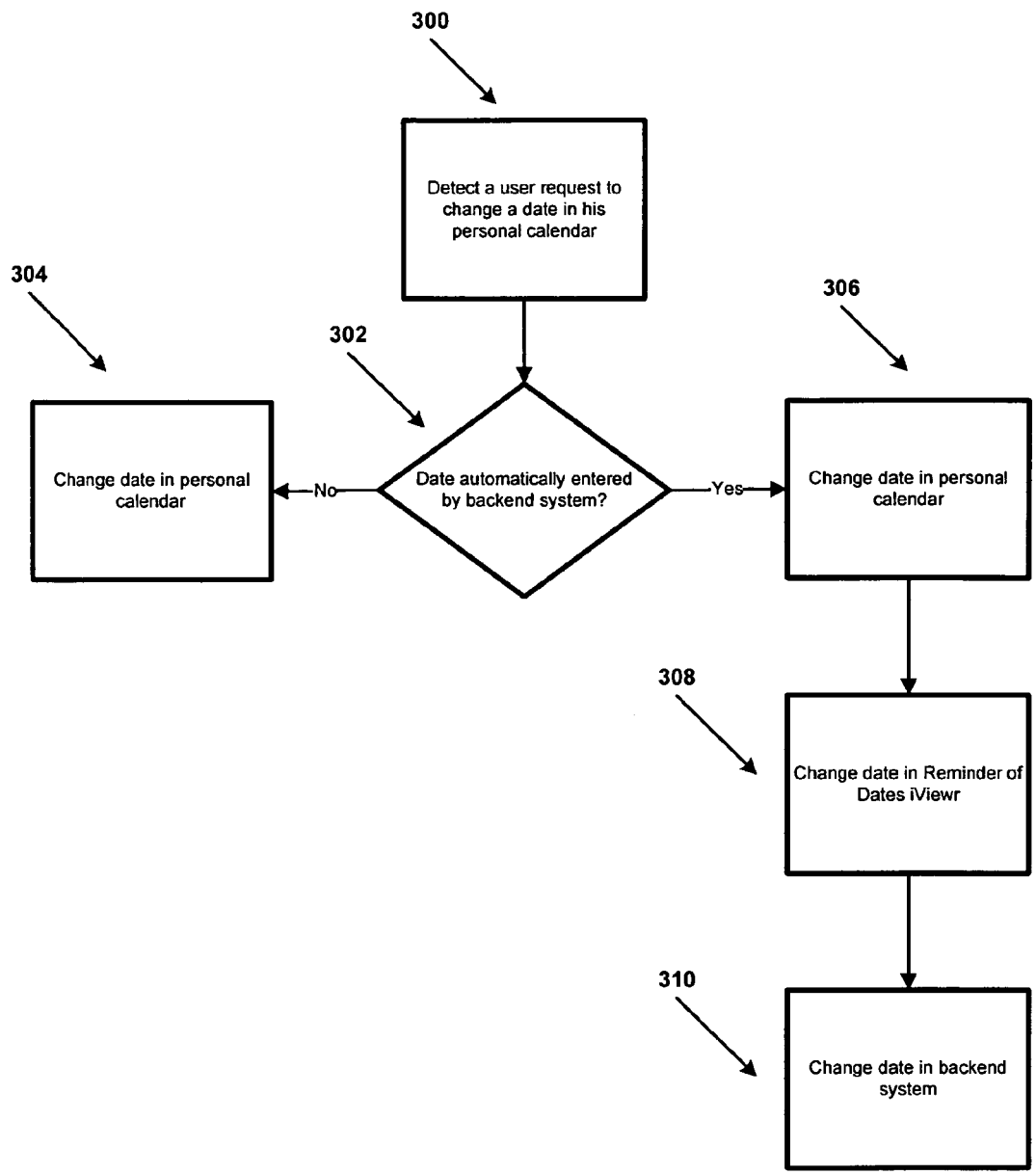
FIG. 3 is a dataflow diagram illustrating the operation of an alternative embodiment of the present invention.

FIG. 3 is a dataflow diagram of an alternative embodiment of the present invention. This method is operable when a user changes a date in his personal calendar that had been automatically inserted there by an embodiment of the present invention. The method begins when the CPU 106 detects a user request to change a date in his personal calendar, step 300. The CPU 106 determines whether the date has been manually entered into the calendar by the user or whether the date has been automatically entered into the calendar by the backend system via an embodiment of the present invention, step 302. The CPU 106 may make this determination by establishing whether the date has an identifying tag placed on dates entered into the manager's personal calendar by an embodiment of the present invention. If the date has been manually entered into the calendar by the user, the CPU 106 changes the date in the calendar according to the user's specifications, step 304. If the date has been entered into the calendar automatically by an embodiment of the present invention, the CPU 106 changes the date in the calendar according to the user's specifications, step 306. Additionally, the CPU 106 changes the date in the Reminder of Dates iView, step 308, and changes the date in the human resources database 110 in the backend system, step 310.

Figure 4:
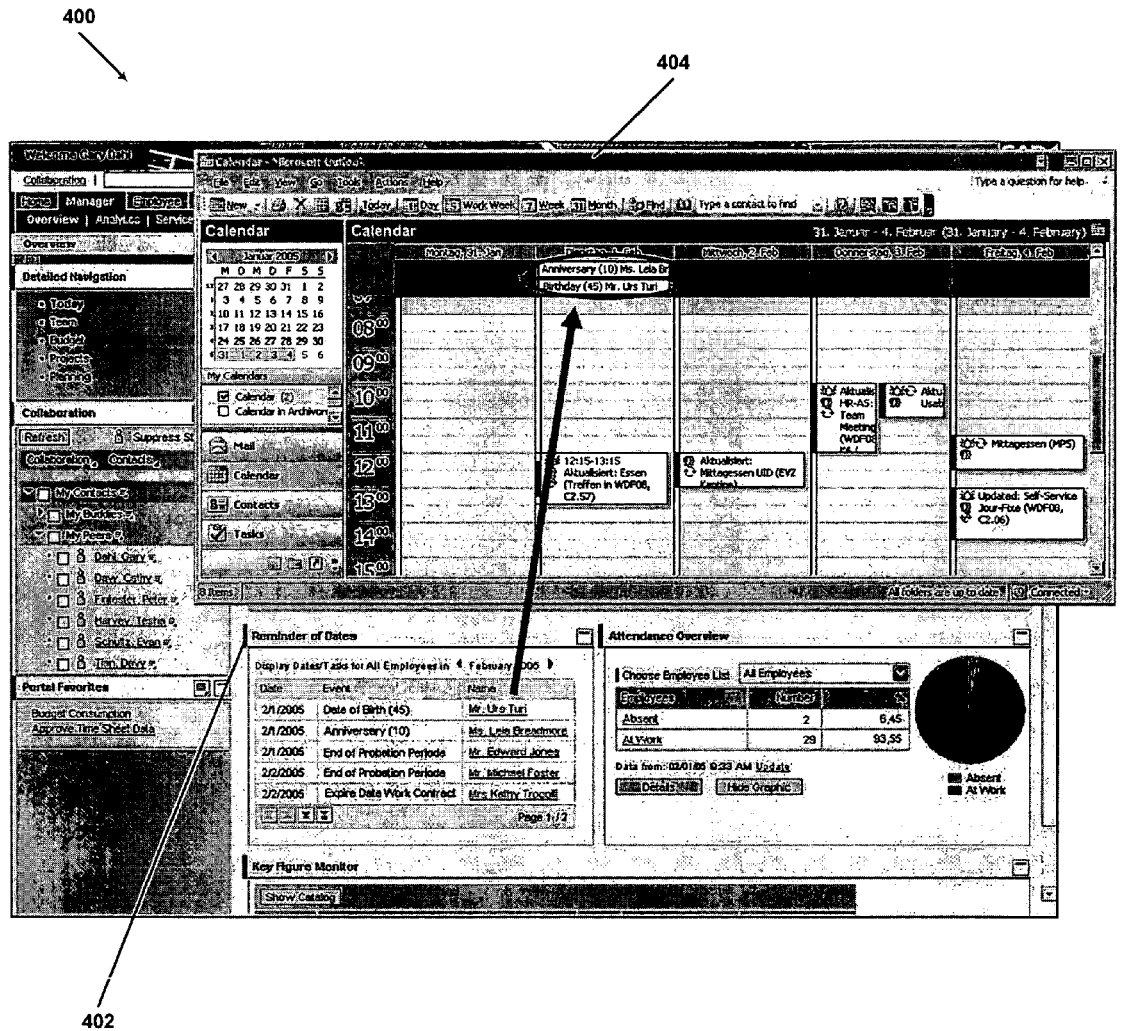
FIGS. 4-6 are screen shots illustrating the operation of embodiments of the present invention.

FIG. 4 is a screen shot of a computer screen 400 employing an embodiment of the present invention. The Reminder of Dates iView 402 displays the types of dates selected by the manager which pertain to his employees. The manager's personal calendar 404 displays the manager's personal appointments which he has manually inputted. In this screen shot 400, the manager's personal calendar 404 also displays certain categories of dates selected by the manager which are also displayed in the Reminder of Dates iView 402.

Figure 5:
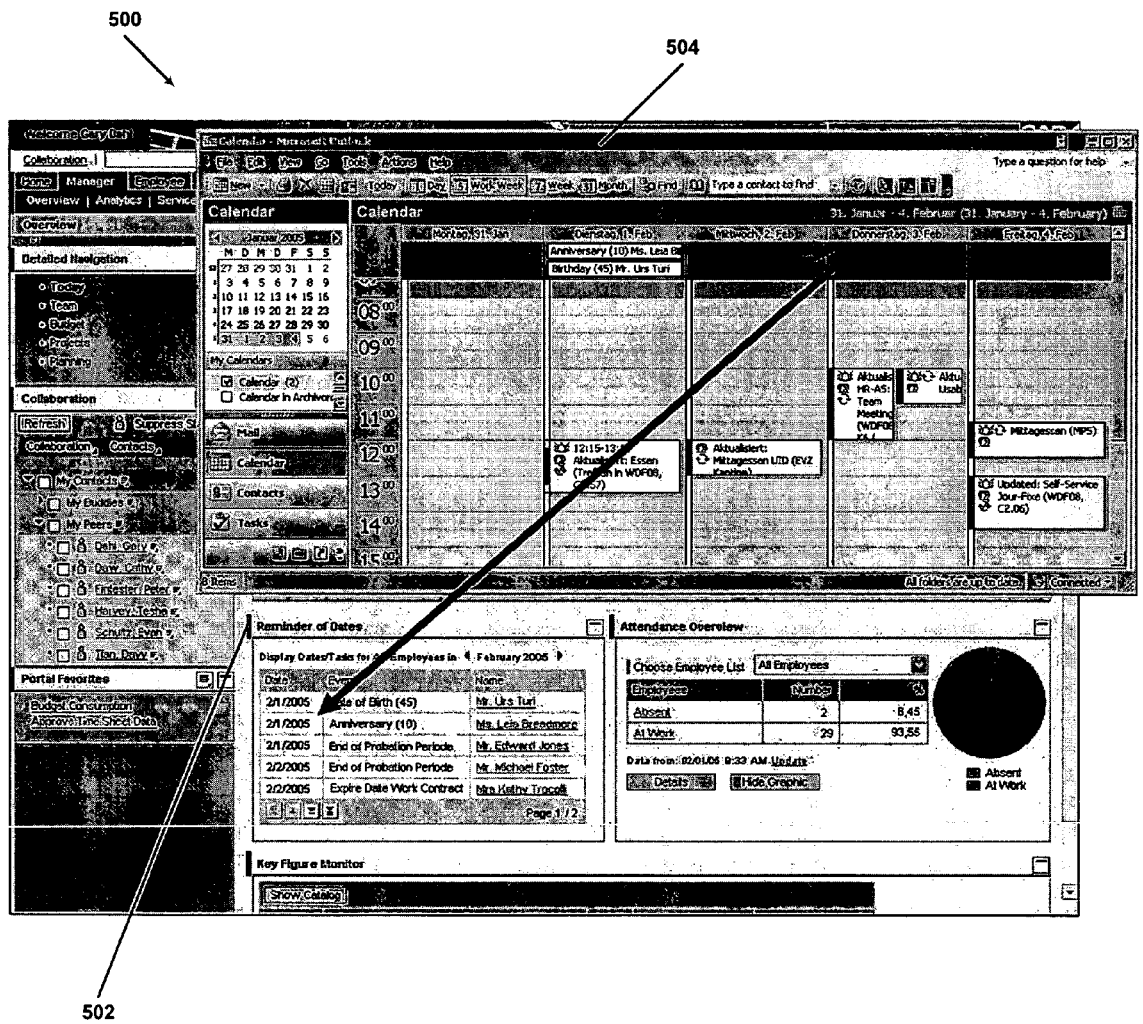

FIG. 5 is a screen shot of a computer screen 500 employing an embodiment of the present invention. The Reminder of Dates iView 502 displays the types of dates selected by the manager which pertain to his employees. The manager's personal calendar 504 displays the manager's personal appointments which he has manually inputted. In this screen shot 500, the manager's personal calendar 504 also displays certain categories of dates selected by the manager which are also displayed in the Reminder of Dates iView 502. In this screen shot 500, the manager changes a date which has been automatically entered in the calendar 504. This, in turn, changes the date in the Reminder of Dates iView 502.

Figure 6A:
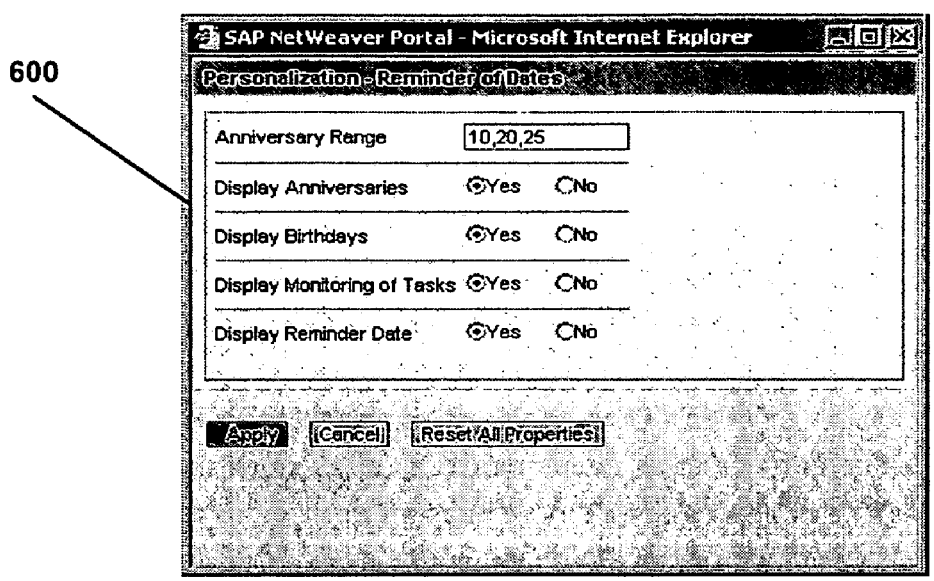

FIG. 6A is a graphical representation of a personalization dialogue 600 which works in conjunction with the Reminder of Dates iView. This representation shows the personalization dialogue where the manager may select the types of data he wishes to have displayed in the Reminder of Dates iView. In this example, the categories of dates the manager may select are anniversaries, birthdays, monitoring of tasks, and reminder date. For example, "monitoring of dates" may be the end of employee probation, maternity leave, or any other event relating to an employee. "Reminder date" may be, for example, a date on which the manager wishes to be reminded of an upcoming event, such as the end of employee probation. This date may be any predefined amount of time before the actual event.

Figure 6B:
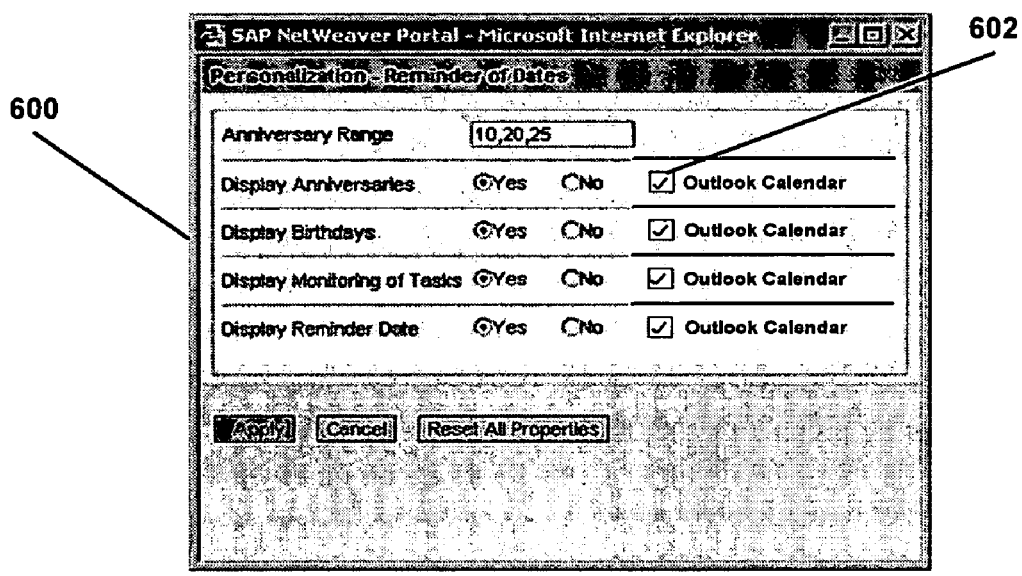

FIG. 6B is a graphical representation of a personalization dialogue 600 which works in conjunction with the Reminder of Dates iView and which incorporates an embodiment of the present invention. Next to each category of dates which a manager may select for display in the Reminder of Dates iView, there is a check box 602 entitled "Outlook Calendar." If the manager wishes to display a category of dates in his personal calendar, he will click on the "Outlook calendar" check box 602. A check box 602 may become disabled if the manager has selected "no" to its associated category of dates. For example, if a manager indicates "no" to the "Display birthdays" category, the associated "Outlook Calendar" check box 602 may become disabled.

What is claimed is:

1. A method for integrating a first application storing predetermined date information with a personal calendar application, comprising:

storing, by a computer processor, human resource data relating to each employee in a backend database system, wherein the backend database system maintains a correlation between managers and employees under supervision of each manager;

receiving, by the computer processor, a first request from a manager to select a set of reminder dates associated with employees to be displayed in the first application;

receiving, by the computer processor, a second request from the manager to display a subset of the reminder dates in the manager's personal calendar;

based on the identity of the manager, determining, by the computer processor, a respective set of employees and the reminder dates associated with the respective set of the employees;

providing, by the computer processor, the subset of reminder dates to said personal calendar, each reminder date being provided with an identifying tag;

receiving, by the computer processor, inputs from the manager modifying a reminder date in the personal calendar;

determining, by the computer processor, whether the modified reminder date has an associated identifying tag; and modifying, by the computer processor, a corresponding date in the backend database system if the modified date has an associated identifying tag.

2. The method of claim 1, further comprising displaying said set of reminder dates in the first application and the subset of the reminder dates in the personal calendar.

3. The method of claim 1, wherein the first request contains a request for certain types of reminder dates.

4. The method of claim 3, the certain types of reminder dates include anniversaries.

5. The method of claim 3, the certain types of reminder dates include birthdays.

6. The method of claim 3, the certain types of reminder dates include end of contract.

7. The method of claim 3, the certain types of reminder dates include maternity leave.

8. A computer system for integrating a first application storing predetermined date information with a personal calendar application, the computer system comprising a computer processor operable to:

store human resource data relating to each employee in a backend database system, wherein the backend database system maintains a correlation between managers and employees under supervision of each manager;

receive a first request from a manager to select a set of reminder dates associated with employees to be displayed in the first application;

receive a second request from the manager to display a subset of the reminder dates in the manager's personal calendar;

based on the identity of the manager, determine a respective set of employees and the reminder dates associated with the respective set of the employees;

provide the subset of reminder dates to said personal calendar, each reminder date being provided with an identifying tag;

receive inputs from the manager modifying a reminder date in the personal calendar;

determine whether the modified reminder date has an associated identifying tag; and modify a corresponding date in the backend database system if the modified date has an associated identifying tag.

9. The computer system of claim 8, further wherein the computer processor is further operable to display said set of reminder dates in the first application and the subset of the reminder dates in the personal calendar.

10. The computer system of claim 8, wherein the first request contains a request for certain types of reminder dates.

11. The computer system of claim 10, the certain types of reminder dates include anniversaries.

12. The computer system of claim 10, the certain types of reminder dates include birthdays.

13. The computer system of claim 10, the certain types of reminder dates include end of contract.

14. The computer system of claim 10, the certain types of reminder dates include maternity leave.

15. An article of manufacture comprising a computer readable storage medium storing instructions adapted to be executed by a processor, the instructions, when executed, defining a method for integrating a first application storing predetermined date information with a personal calendar application, the method comprising:

storing human resource data relating to each employee in a backend database system, wherein the backend database system maintains a correlation between managers and employees under supervision of each manager;

receiving a first request from a manager to select a set of reminder dates associated with employees to be displayed in the first application;

receiving a second request from the manager to display a subset of the reminder dates in the manager's personal calendar;

based on the identity of the manager, determining a respective set of employees and the reminder dates associated with the respective set of the employees;

providing the subset of reminder dates to personal calendar, each reminder date being provided with an identifying tag;

receiving inputs from the manager modifying a reminder date in the personal calendar;

determining whether the modified reminder date has an associated identifying tag; and modifying a corresponding date in the backend database system if the modified date has an associated identifying tag.

16. The article of manufacture of claim 15, further comprising displaying said set of reminder dates in the first application and the subset of the reminder dates in the personal calendar.

17. The article of manufacture of claim 15, wherein the first request contains a request for certain types of reminder dates.

18. The article of manufacture of claim 17, the certain types of reminder dates include anniversaries.

19. The article of manufacture of claim 17, the certain types of reminder dates include birthdays.

20. The article of manufacture of claim 17, the certain types of reminder dates include end of contract.

21. The article of manufacture of claim 17, the certain types of reminder dates include maternity leave.

* * * * *